120,689

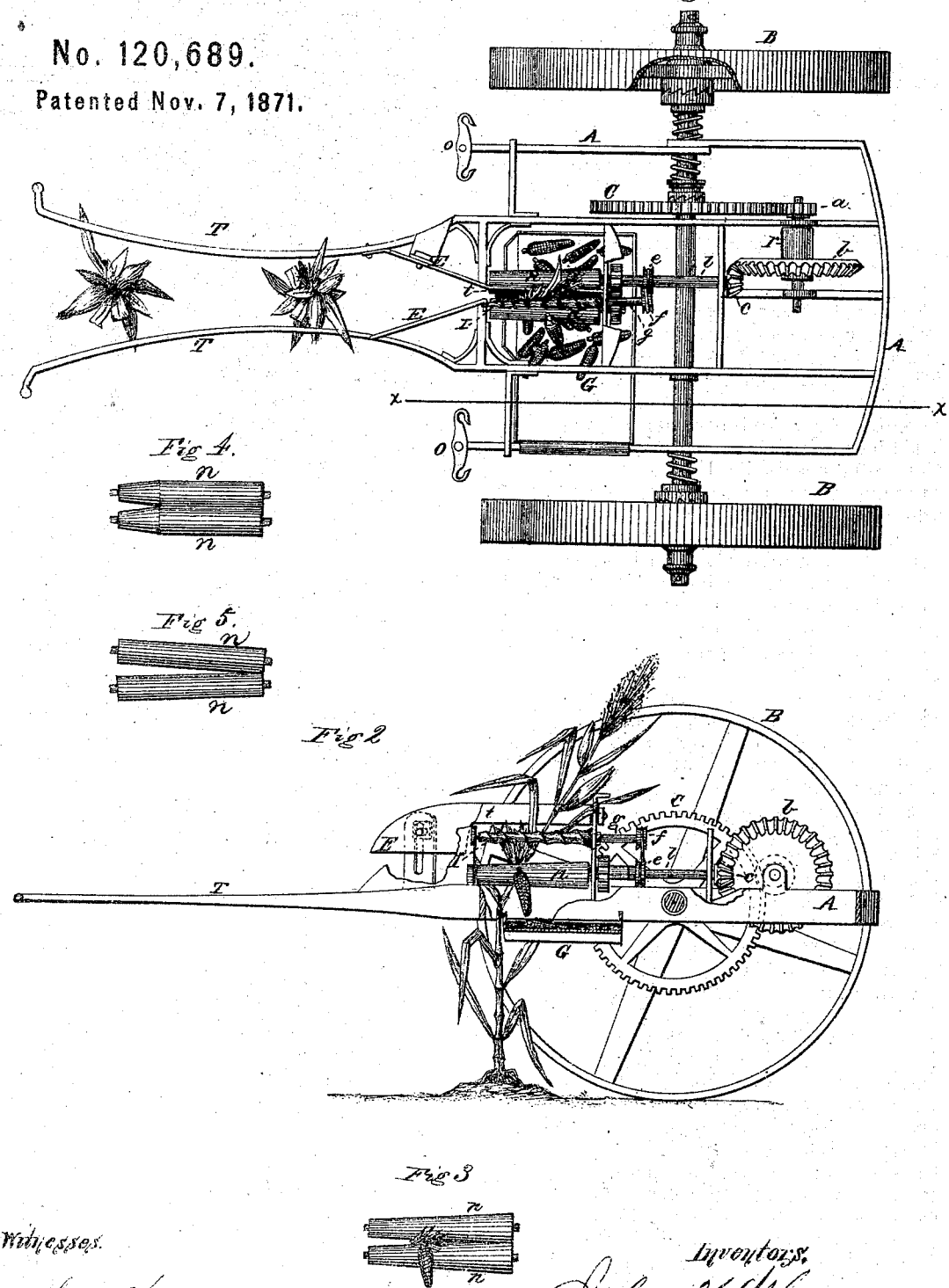

UNITED STATES PATENT OFFICE.

JOHN H. WHITNEY, OF ROCHESTER, MINNESOTA, AND WILLIAM W. MARSH, OF DE KALB, ILLINOIS.

IMPROVEMENT IN FIELD CORN-HUSKERS.

Specification forming part of Letters Patent No. 120,689, dated November 7, 1871.

*To all whom it may concern:*

Be it known that we, JOHN H. WHITNEY, of Rochester, in the county of Olmsted and State of Minnesota, and WILLIAM W. MARSH, of De Kalb, in the county of De Kalb and State of Illinois, have invented certain Improvements in Corn-Husking Machines, of which the following is a specification, reference being had to the accompanying drawing, in which like letters refer to like parts wherever they occur.

Our invention relates to machines for husking corn; and the invention consists in arranging a pair of conical or partly-conical or straight rolls in such a manner as to operate upon the stalk and husk and perform the twofold operation of picking and husking the ears; and in various mechanical devices to be operated, in connection with said rolls, to assist and render more perfect the operation; and finally in mounting the apparatus on wheels, and arranging it to be operated while moving along, so as to pick and husk the corn as it stands in the field where grown.

Figure 1 is a top-plan view; Fig. 2, a longitudinal vertical section on the line $x\,x$ of Fig. 1. Fig. 3 is a plan view of the conical rollers detached. Fig. 4 is a plan view of the partly-conical rollers detached. Fig. 5 is a plan view of the straight rollers detached.

A very large proportion of the labor and expense of the corn-crop of the country pertains to the gathering of the crop after it is grown, and from the nature of the plant this labor has hitherto been performed almost wholly by hand. Recently various efforts have been made to produce machines that would husk the ears after they were picked and were brought to the machine, and more recently machines have been made intended to both husk the ears and at the same time separate them from the stalks. In these cases, however, the corn has to be either picked from the stalks in the field and hauled to the machine, or else the stalks with the ears on have to be cut and hauled, thus involving an immense expenditure of time and labor. Now, our invention is intended to remedy this by picking and husking the ears from the stalks as they stand in the field, so as to gather and husk the corn by drawing the machine over the field the same as a harvester cuts grain by being drawn along over the field.

To accomplish this object we construct our machine as follows: We provide a frame, A, of any suitable size and form, and mount it on two or more wheels, two only being represented in the drawing, and they being attached to the axle by spring-clutches the same as harvester-wheels are, so that the machine can be backed or turned without operating the mechanism. The tongue of the machine consists of two bars or poles, T, of suitable length, attached rigidly to the frame A with an open space between them, as shown in Fig. 1, their front ends being preferably curved outward, so as the more easily to permit them to straddle the row of corn as the machine is drawn along, as also to assist in hitching the team. A whiffletree, $o$, is attached on each side to the frame A, though, if preferred, they may be connected by rods or chains to an evener located under the main frame, either in front or rear of the axle. Upon the frame thus mounted on wheels we locate our improved husking-and-picking apparatus, which consists of two or more rollers, $n$, which may be conical, partly conical, or straight, and inclined as represented in the drawing, the rollers $n$ covered with rubber. In front of the rollers, which are mounted centrally at the front of the frame, as shown in Figs. 1 and 2, we secure two upright plates, E, which have their front ends inclined outward and secured to the bars T, to serve as a guide to the stalks and insure their entering between the rollers $n$. Above the rollers we secure a bar, $t$, which can be moved vertically, and which may be made to adjust laterally, also, if desired, to assist in breaking the shank of the ear by bending the same; and parallel with this bar $t$, we locate a shaft, I, having a spiral flange or screw-thread on it, for the purpose of assisting to draw the stalk backward between the rollers.

To operate these devices we secure to the axle a driving or gear-wheel, C, which gears into a pinion, $a$, on a short transverse shaft, $r$, which carries on its opposite end a bevel-wheel, $b$, which in turn engages with and drives a bevel-pinion, $c$, secured to the rear end of the shaft $l$ of one of the rollers $n$. On this shaft $l$ is secured a spur-wheel or pinion, which engages in a similar pinion on the shaft of the other roller $n$, thus causing the two rollers $n$ to revolve toward each other. On the shaft $s$ of one of the rollers $n$ we locate a pulley, $e$, from which extends a cord to a pulley, $f$, on the shaft $g$ of the screw I, by which motion is imparted to it at the same time. A box or receptacle, G, of any suitable kind is arranged under the front of the machine, alongside of the rolls $n$, to receive the ears when husked and separated from the stalk, and from whence they may be conveyed by a conveyer into sacks or into a wagon in rear of or alongside the machine, these latter not being represented in the drawing.

The operation of the machine is as follows: Being drawn along so as to straddle a row of standing corn, the stalks are guided in between the rollers $n$, the screw I drawing the stalks back faster than the machine advances, thereby forcing the stalk back between the rollers; and as the rollers draw the stalk down by the side of the breaker T, by the assistance of the same, the ear will be readily forced from the husk and crowded off from the rollers $n$, and then fall into the box or receptacle G. The stalk being drawn down between the rollers as the machine is drawn along, the ears are conveyed from the box or receptacle G by a conveyer into sacks or into a wagon, in rear or alongside of the machine.

Having thus described our invention, what we claim is—

1. In combination with the husking-rollers $n$, the breaker-bar $t$, made adjustable, substantially as described.

2. The combination, in a field corn-husker, of the forked tongue T, rubber-covered rollers $n$, screw I, and adjustable breaker-bar $t$, when said parts are constructed and arranged for operation substantially as described.

JOHN H. WHITNEY.
WILLIAM W. MARSH.

R. L. DIVINE,
J. L. PRATT.

(59)